US008466397B1

(12) United States Patent
Teter et al.

(10) Patent No.: US 8,466,397 B1
(45) Date of Patent: Jun. 18, 2013

(54) METHODS AND APPARATUS FOR VARYING A TRIM OF A VEHICLE

(75) Inventors: Roger D. Teter, Sunnyvale, CA (US); Steven Dunn, Livermore, CA (US); Kenneth Barczi, Cupertino, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 275 days.

(21) Appl. No.: 13/091,104

(22) Filed: Apr. 20, 2011

Related U.S. Application Data

(60) Provisional application No. 61/432,166, filed on Jan. 12, 2011, provisional application No. 61/432,167, filed on Jan. 12, 2011.

(51) Int. Cl.
*F42B 10/62* (2006.01)

(52) U.S. Cl.
USPC .............................. 244/3.21; 244/3.1; 102/384

(58) Field of Classification Search
USPC ....... 244/3.21, 3.22, 3.24, 3.29, 3.1; 102/384; 114/23
See application file for complete search history.

(56) References Cited

U.S. PATENT DOCUMENTS

| | | | | |
|---|---|---|---|---|
| 3,069,112 A | * | 12/1962 | Patterson | 244/3.19 |
| 4,399,962 A | * | 8/1983 | Wedertz et al. | 244/3.23 |
| 4,579,298 A | * | 4/1986 | Thomson | 244/3.21 |
| 4,998,994 A | * | 3/1991 | Schmidt et al. | 244/3.1 |
| 5,083,724 A | * | 1/1992 | Kranz | 244/3.21 |
| 5,139,216 A | * | 8/1992 | Larkin | 244/3.21 |
| 5,186,117 A | * | 2/1993 | Stallard, III | 114/330 |
| 5,505,409 A | * | 4/1996 | Wells et al. | 244/130 |
| 6,283,407 B1 | * | 9/2001 | Hakenesch | 244/3.21 |
| 6,364,248 B1 | * | 4/2002 | Spate et al. | 244/3.23 |
| 6,502,785 B1 | | 1/2003 | Teter et al. | |
| 7,262,394 B2 | * | 8/2007 | August | 244/3.3 |
| 7,267,303 B1 | | 9/2007 | Teter et al. | |
| 7,380,504 B2 | * | 6/2008 | Dryer | 102/520 |
| 7,428,870 B1 | * | 9/2008 | Nedderman | 102/399 |
| 7,834,301 B2 | * | 11/2010 | Clingman | 244/3.15 |
| 7,963,442 B2 | * | 6/2011 | Jenkins et al. | 235/411 |
| 2008/0142591 A1 | * | 6/2008 | Jenkins et al. | 235/411 |

\* cited by examiner

*Primary Examiner* — Benjamin P Lee
(74) *Attorney, Agent, or Firm* — McDermott Will & Emery LLP

(57) ABSTRACT

Methods and apparatus for varying a trim of a vehicle are provided. A nose cone assembly for a vehicle includes an angle cone portion and a nose cone portion rotatably coupled to the angle cone portion. The angle cone portion and the nose cone portion are arranged such that a plane of rotation between the angle cone portion and the nose cone portion is slanted at an angle relative to a plane perpendicular to a long axis of the vehicle. The angle cone portion rotates relative to the vehicle body about the long axis. The nose cone portion rotates relative to the angle cone portion about an axis normal to the plane of rotation. A tip of the nose cone portion varies in position relative to the long axis of the vehicle based on the rotation of the angle cone portion and the rotation of the nose cone portion.

20 Claims, 11 Drawing Sheets

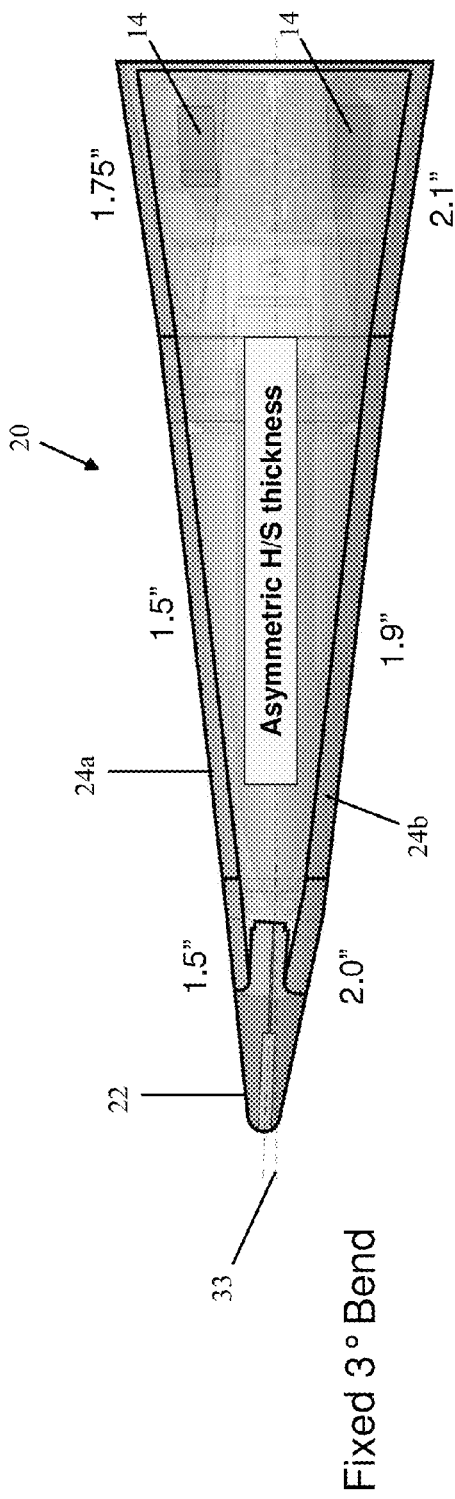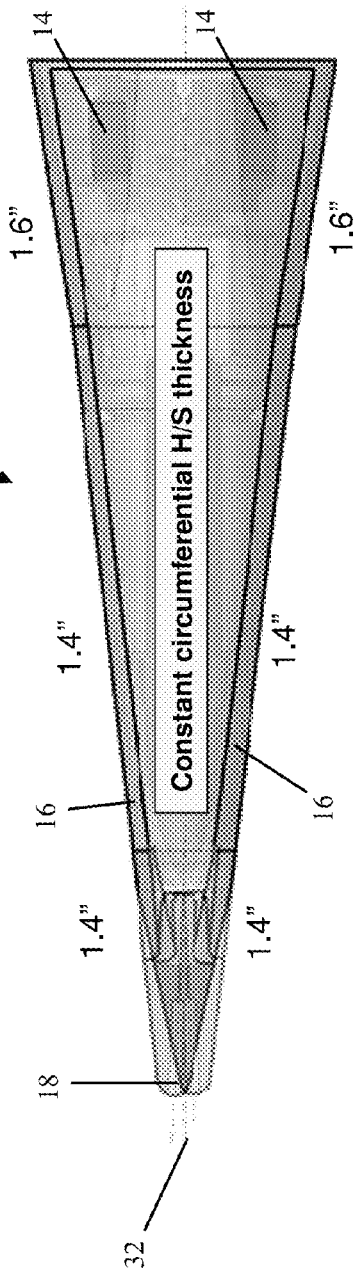
FIG. 3A
FIG. 3B

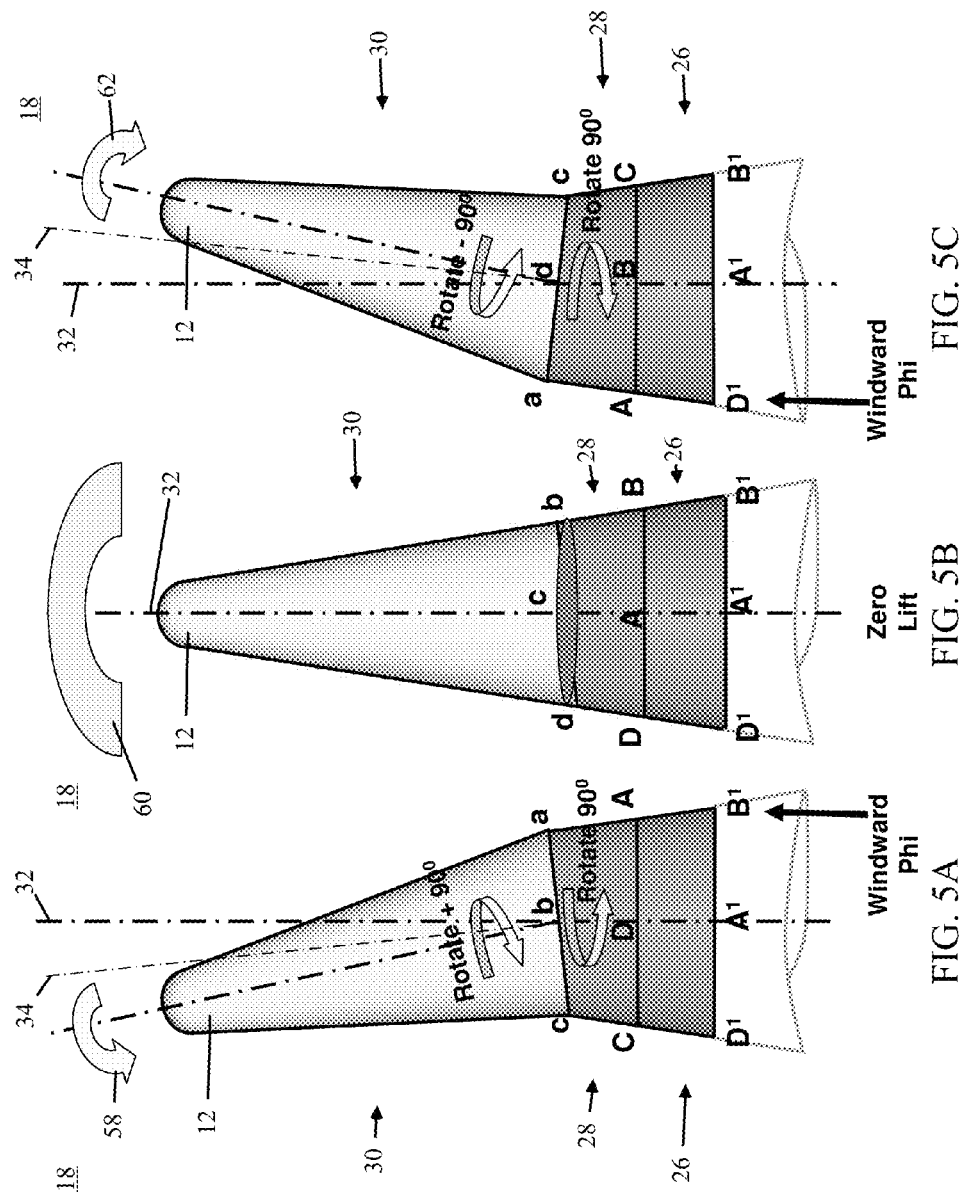

600

Start

↓ rotate an angle cone portion relative to a body of the vehicle about a long axis of the vehicle, wherein the angle cone portion is rotatably coupled to the body
602

↓ rotate a nose cone portion relative to the angle cone portion, wherein the angle cone portion and the nose cone portion are arranged such that a plane of rotation between the angle cone portion and the nose cone portion is slanted at an angle relative to a plane perpendicular to the long axis of the vehicle, wherein the nose cone portion is rotated about an axis normal to the plane of rotation
604

↓ vary a position of a tip of the nose cone portion relative to the long axis of the vehicle based on the rotating the angle cone portion and the rotating the nose cone portion
606

↓

End

FIG. 6

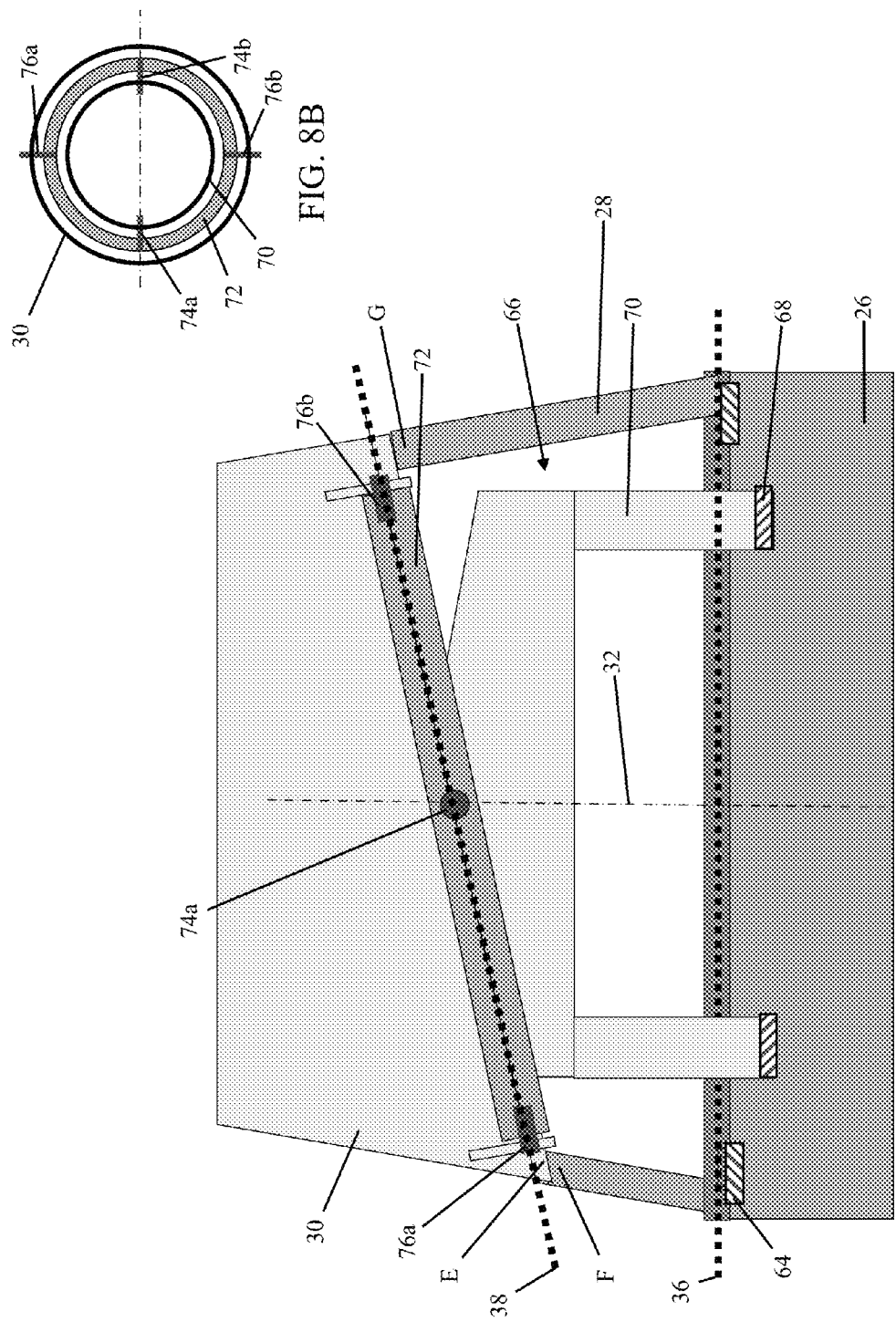

900

```
     ┌─────────┐
     │  Start  │
     └─────────┘
          │
          ▼
┌─────────────────────────────────────────────────────────┐
│ rotate a first rotational element of the vehicle       │
│ relative to a body of the vehicle                       │
│ 902                                                     │
└─────────────────────────────────────────────────────────┘
          │
          ▼
┌─────────────────────────────────────────────────────────┐
│ rotate a drive structure relative to the body, wherein  │
│ the drive structure is coupled to a gimbal element via  │
│ a first joint pin, wherein the gimbal element is        │
│ coupled to a second rotational element of the vehicle   │
│ such that when the drive structure is rotated relative  │
│ to the body, the second rotational element rotates      │
│ relative to the first rotational element               │
│ 904                                                     │
└─────────────────────────────────────────────────────────┘
          │
          ▼
┌─────────────────────────────────────────────────────────┐
│ pivot the gimbal element about the first joint pin     │
│ relative to the drive structure based on the rotation   │
│ of the first rotational element and the rotation of     │
│ the second rotational element                          │
│ 906                                                     │
└─────────────────────────────────────────────────────────┘
          │
          ▼
     ┌─────────┐
     │   End   │
     └─────────┘
```

FIG. 9

METHODS AND APPARATUS FOR VARYING A TRIM OF A VEHICLE

CROSS-REFERENCES TO RELATED APPLICATIONS

The present application claims the benefit of U.S. Provisional Patent Application Ser. No. 61/432,167, entitled "VARIABLE TRIM, THREE AXIS CONTROL," filed on Jan. 12, 2011, and U.S. Provisional Patent Application Ser. No. 61/432,166, entitled "ARTICULATING BODY MECHANIZATION," filed on Jan. 12, 2011, which are both hereby incorporated by reference in their entirety for all purposes.

STATEMENT AS TO RIGHTS TO INVENTIONS MADE UNDER FEDERALLY SPONSORED RESEARCH OR DEVELOPMENT

Not Applicable.

FIELD

The present invention generally relates to vehicle control and, in particular, relates to methods and apparatus for varying a trim of a vehicle.

BACKGROUND

Various fixed trim methods for controlling supersonic glide vehicles may either lack three axis control, which limits vehicle controllability and mission flexibility, or may constrain vehicle design to asymmetric heatshields and complicated flap heat management schemes that are costly in terms of weight and volume. These limitations may affect the accuracy and effectiveness of missions that the vehicles can support, such as by reducing the effective payload the vehicles can deliver.

SUMMARY

According to various aspects of the subject technology, variable trim capability may be added to vehicles and/or vehicle control systems. Variable trim may be achieved by changing the nose bend angle of a vehicle to minimize control flap deflections and reduce asymmetric heating on a heatshield. In some aspects, the trim of a vehicle may be varied in either multiple trim planes or in a single defined plane of motion for more accurate, efficient and effective control and design of vehicle aerodynamic control and thermal protection systems. In some aspects, articulating vehicle elements may be used to provide variable trim capability for a vehicle. In this regard, non-complex and efficient methods and apparatus for controlling an articulating body with rotational segments are provided.

According to various aspects of the subject technology, a nose cone assembly for a vehicle is provided. The nose cone assembly comprises an angle cone portion configured to rotatably couple to a body of the vehicle. The nose cone assembly also comprises a nose cone portion rotatably coupled to the angle cone portion. The angle cone portion and the nose cone portion are arranged such that a plane of rotation between the angle cone portion and the nose cone portion is slanted at an angle relative to a plane perpendicular to a long axis of the vehicle. The angle cone portion is configured to rotate relative to the body about the long axis of the vehicle. The nose cone portion is configured to rotate relative to the angle cone portion about an axis normal to the plane of rotation. A tip of the nose cone portion is configured to vary in position relative to the long axis of the vehicle based on the rotation of the angle cone portion and the rotation of the nose cone portion.

According to various aspects of the subject technology, a method for varying a trim of a vehicle is provided. The method comprises providing an angle cone portion for rotating the angle cone portion relative to a body of the vehicle about a long axis of the vehicle. The angle cone portion is configured to rotatably couple to the body. The method also comprises providing a nose cone portion rotatably coupled to the angle cone portion for rotating the nose cone portion relative to the angle cone portion. The angle cone portion and the nose cone portion are arranged such that a plane of rotation between the angle cone portion and the nose cone portion is slanted at an angle relative to a plane perpendicular to the long axis of the vehicle. The nose cone portion is configured to rotate about an axis normal to the plane of rotation. A tip of the nose cone portion is configured to vary in position relative to the long axis of the vehicle based on the rotation of the angle cone portion and the rotation of the nose cone portion.

According to various aspects of the subject technology, an airborne vehicle is provided. The vehicle comprises a body and a nose cone assembly. The nose cone assembly comprises an angle cone portion rotatably coupled to the body. The nose cone assembly also comprises a nose cone portion rotatably coupled to the angle cone portion. The angle cone portion and the nose cone portion are arranged such that a plane of rotation between the angle cone portion and the nose cone portion is slanted at an angle relative to a plane perpendicular to a long axis of the vehicle. The angle cone portion is configured to rotate relative to the body about the long axis of the vehicle. The nose cone portion is configured to rotate relative to the angle cone portion about an axis normal to the plane of rotation. A tip of the nose cone portion is configured to vary in position relative to the long axis of the vehicle based on the rotation of the angle cone portion and the rotation of the nose cone portion.

According to various aspects of the subject technology, an apparatus for driving rotational elements of a vehicle is provided. The apparatus comprises a first driving member configured to rotate a first rotational element of the vehicle relative to a body of the vehicle. The apparatus also comprises a second driving member. The second driving member comprises a drive structure rotatably coupled to the body. The second driving member also comprises a gimbal element coupled to the drive structure via a first joint pin. The gimbal element is configured to couple to a second rotational element of the vehicle such that when the drive structure is rotated relative to the body, the second rotational element rotates relative to the first rotational element. The gimbal element is configured to pivot about the first joint pin relative to the drive structure based on the rotation of the first rotational element and the rotation of the second rotational element.

According to various aspects of the subject technology, a method for driving rotational elements of a vehicle is provided. The method comprises providing a first driving member for rotating a first rotational element of the vehicle relative to a body of the vehicle. The method also comprises providing a second driving member comprising a drive structure for rotating the drive structure relative to the body. The second driving member further comprises a gimbal element. The drive structure is coupled to the gimbal element via a first joint pin. The gimbal element is coupled to a second rotational element of the vehicle such that when the drive structure is rotated relative to the body, the second rotational element rotates relative to the first rotational element. The gimbal element is configured to pivot about the first joint pin relative to the drive structure based on the rotation of the first rotational element and the rotation of the second rotational element.

According to various aspects of the subject technology, an apparatus for varying a trim of a vehicle is provided. The apparatus comprises an angle cone portion configured to rotatably couple to a body of a vehicle, a nose cone portion rotatably coupled to the angle cone portion, and a first driving member configured to rotate the angle cone portion relative to the body. The apparatus also comprises a second driving member. The second driving member comprises a drive structure configured to rotatably couple to the body. The second driving member also comprises a gimbal element coupled to the drive structure via a first joint pin. The gimbal element is further coupled to the nose cone portion such that when the drive structure is rotated relative to the body, the nose cone portion rotates relative to the angle cone portion. The gimbal element is configured to pivot about the first joint pin relative to the drive structure based on the rotation of the angle cone portion and the rotation of the nose cone portion.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 3A illustrates an example of a vehicle with a fixed trim.

FIG. 3B illustrates an example of a vehicle equipped with variable trim capability, in accordance with various aspects of the subject technology.

FIGS. 5A, 5B, and 5C illustrate side views of a nose cone portion and an angle cone portion rotated at various positions, in accordance with various aspects of the subject technology.

FIG. 6 illustrates an example of a method for varying a trim of a vehicle, in accordance with various aspects of the subject technology.

FIG. 8A illustrates a side view of a second driving member while FIG. 8B illustrates a top view of the second driving member, in accordance with various aspects of the subject technology.

FIG. 9 illustrates an example of a method for driving rotational elements of a vehicle, in accordance with various aspects of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Variable Trim

Figure 1A:
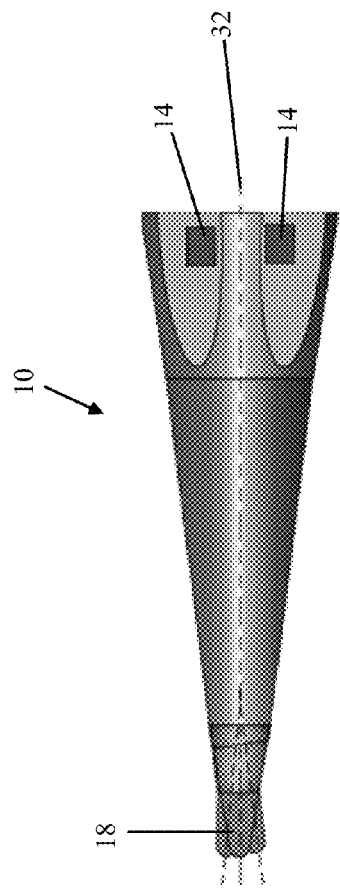
FIG. 1A illustrates a side view of a forward portion of a vehicle equipped with variable trim capability, in accordance with various aspects of the subject technology.
Figure 1C:
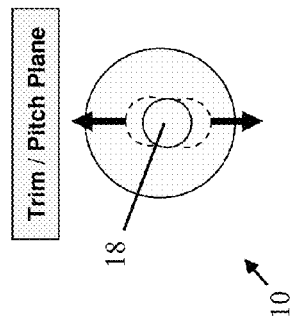
FIG. 1C illustrates a cross-sectional view of a nose of a vehicle, in accordance with various aspects of the subject technology.
Figure 1B:
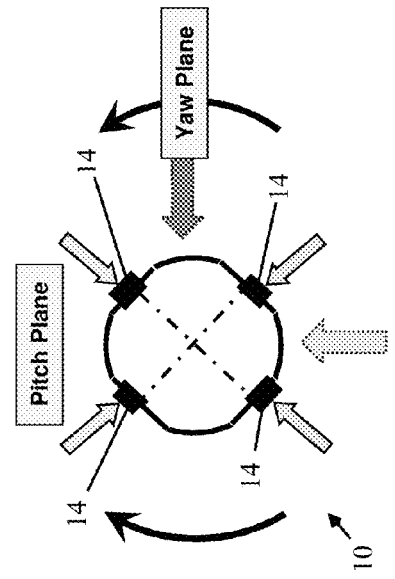
FIG. 1B illustrates a cross-sectional view of a vehicle with flaps that provide pitch, yaw, and roll control, in accordance with various aspects of the subject technology.

FIG. 1A illustrates a side view of a forward portion of vehicle 10 equipped with variable trim capability, in accordance with various aspects of the subject technology. As shown, vehicle 10 is a projectile (e.g., a missile). However, the variable trim capability may be applied to other suitable types of vehicles such as aircraft, boats, automobiles, and spacecraft/aerospace vehicles (e.g., reentry vehicles). Vehicle 10 comprises nose 18 (e.g., a nosecone, which may also be referred to as a forecone or a nose cone assembly) and one or more flaps 14. FIG. 1B illustrates a cross-sectional view of vehicle 10 and the one or more flaps 14, in accordance with various aspects of the subject technology. The one or more flaps 14 may deploy outwardly away from a body of vehicle 10 for maneuvering vehicle 10 (e.g., to provide de-spin, pitch, yaw, and/or roll control).

However, when the one or more flaps 14 are deployed, air friction is generated, thereby causing heat to be incurred by vehicle 10. Greater deployment of the one or more flaps 14 may create more heating on the one or more flaps 14 specifically, which may be minimized by the variable trim. A secondary effect of the one or more flaps 14 is that they may increase the vehicle angle of attack (AOA), and thus exaggerate windward side heating. But this increased AOA may in some instances be the desired effect whether achieved by the one or more flaps 14 or the variable trim.

According to certain situations, deploying the one or more flaps 14 at a greater angle from the body of vehicle 10 may cause greater air friction to be generated, thereby causing even more heat to be incurred by vehicle 10. Thus, a thick heatshield may be needed to protect vehicle 10 from the heat incurred by vehicle 10. According to certain aspects, the variable trim capability provides adjustable trim and lift control for vehicle 10, thereby allowing use of the one or more flaps 14 to be minimized when maneuvering vehicle 10. FIG. 1C illustrates a cross-sectional view of vehicle 10 and nose 18, in accordance with various aspects of the subject technology. As shown, nose 18 of vehicle 10 may vary in position relative to long axis 32 of the vehicle 10, such as along in a single defined trim plane (e.g., the constant trim/pitch plane shown in FIG. 1C). This may sometimes be referred to as a "bending" of nose 18. In one example, nose 18 may be bent up relative to long axis 32 in order to provide more lift for vehicle 10 and increase the AOA of vehicle 10. Providing the variable trim capability for vehicle 10 may lower the angles at which the one or more flaps 14 are deployed by a factor of three to four compared to vehicles that have fixed trims. This is because in some aspects, the one or more flaps 14 are not relied upon to produce changes in the trim AOA for vehicle 10.

Figure 2:
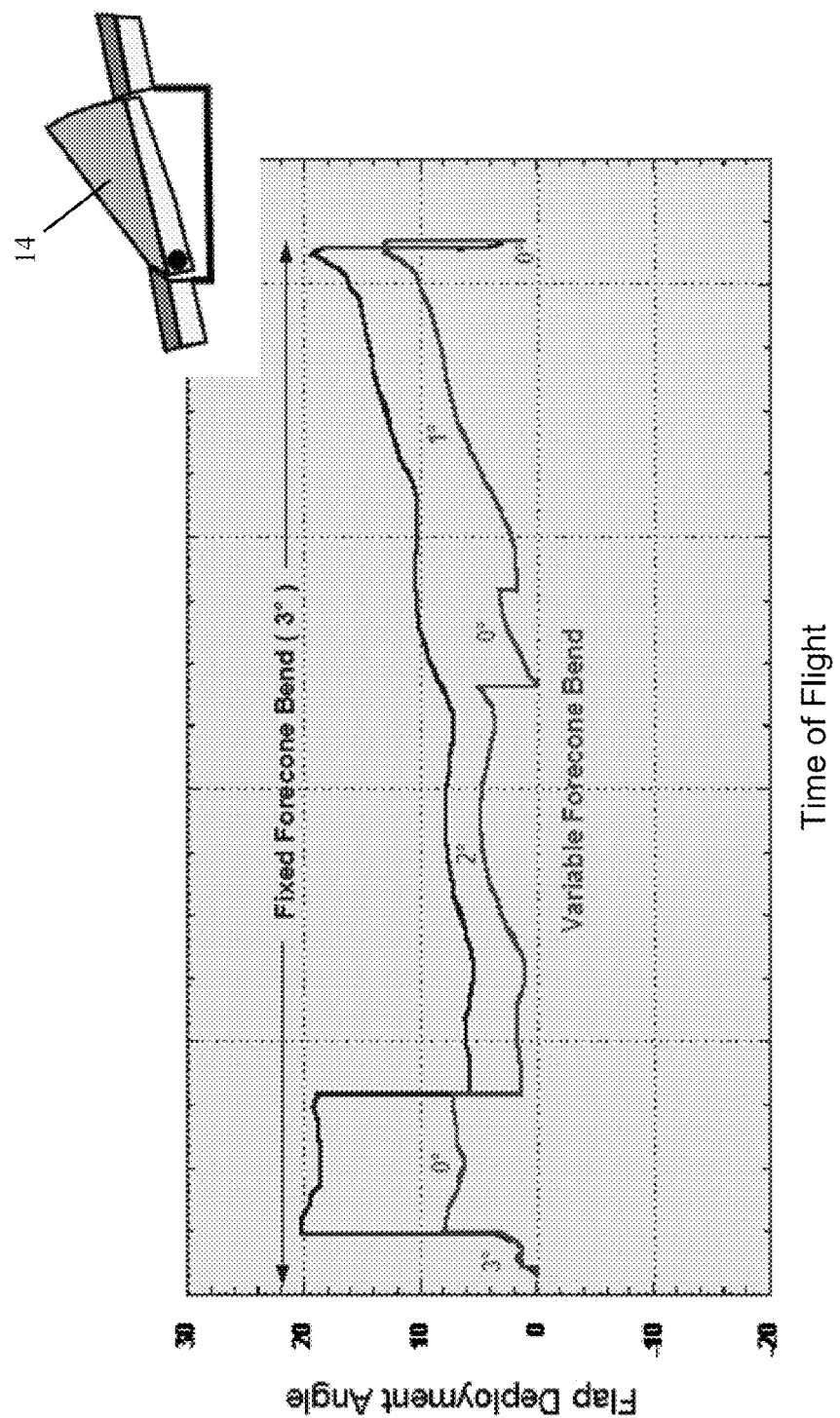
FIG. 2 illustrates an example of a graph comparing the flap deployment angles between a vehicle having a fixed trim and a vehicle having variable trim capability, in accordance with various aspects of the subject technology.

FIG. 2 illustrates an example of a graph comparing the flap deployment angles between a vehicle having a fixed trim (e.g., having a fixed forecone bend) and a vehicle having variable trim capability (e.g., having a variable forecone bend), in accordance with various aspects of the subject technology. This graph demonstrates that the variable trim vehicle uses less flap control deployment than the vehicle having the fixed trim, thereby subjecting the flap control system to a lesser heating environment to achieve the same mission objectives as the fixed trim vehicle design. The flap deployment angles for the vehicle having the fixed trim are greater in magnitude than the flap deployment angles for the vehicle having the variable trim capability. For the vehicle having the fixed trim, the one or more flaps 14 are deployed to counter-act the lift (e.g., for glide insertion through impact) generated as a result of the fixed forecone bend. The one or more flaps 14 remain deployed even at the end of the flight, as shown in FIG. 2. For the vehicle having the variable trim, a three degree forecone bend is employed during early pull out but finishes with a zero degree forecone bend (e.g., for glide insertion). Besides during the early pull out, the vehicle having the variable trim employs forecone bend angles at less than the three degree forecone bend of the fixed trim vehicle (e.g., at forecone bend angles of zero, two, zero, one, and zero degrees during the course of the flight). Thus, compared to the vehicle having the fixed trim, the one or more flaps 14 of the vehicle with the variable trim do not need to be deployed at as great of an angle to counter-act the lift generated as a result of the variable forecone bends.

According to certain aspects of the subject technology, the variable trim capability of a vehicle also allows for balanced thermal loading, thereby permitting a thinner and/or more symmetrical heatshield for the vehicle when compared to vehicles with fixed trims. FIG. 3A illustrates an example of vehicle 20 with a fixed trim (e.g., nose 22 of vehicle 20 is bent up at a fixed angle from long axis 33 of vehicle 20). Because nose 22 of vehicle 20 is bent up relative to long axis 33 of vehicle 20, a greater amount of air makes contact with the windward side of vehicle 20 (e.g., also referred to as windward phi and is shown in FIG. 3A as the bottom side of vehicle 20) than the opposing side of vehicle 20 (e.g., the top side of vehicle 20 as shown in FIG. 3A). Thus, the windward side of vehicle 20 incurs more heat than the opposing side. As a result, heatshield 24b of vehicle 20, which is disposed on the windward side, is thicker than heatshield 24a, which is disposed on the opposing side. Thus, vehicle 20 has an asymmetric heatshield (H/S). The respective dimensions of heatshields 24a and 24b are shown in FIG. 3A.

FIG. 3B illustrates a side view of the forward portion of vehicle 10 equipped with variable trim capability, in accordance with various aspects of the subject technology. Unlike vehicle 20, vehicle 10 comprises a thinner heatshield 16 that is also distributed symmetrically about long axis 32 of vehicle 10. The dimensions of heatshield 16 are shown in FIG. 3B. The variable trim capability of vehicle 10 allows the windward side of vehicle 10 to be changed to other sides of vehicle 10. According to certain aspects, should the windward side of vehicle 10 become too hot, vehicle 10 may be rolled about its long axis 32 (e.g., 180 degrees) and nose 18 may be adjusted accordingly (e.g., bent relative to long axis 32 at the same angle in the opposite direction) so that a cooler side of vehicle 10 becomes the windward side. Vehicle 10 may be rolled and nose 18 may be adjusted repeatedly in this manner such that no side of vehicle 10 becomes too hot compared to the other sides of vehicle 10. Thus, vehicle 10 may be equipped with a symmetrical heatshield 16. Furthermore, heatshield 16 may be thinner compared to heatshields 24a and 24b of vehicle 20 because the one or more flaps 14 of vehicle 10 are deployed at lower angles compared to the one or more flaps 14 of vehicle 20, which generates less air friction and less heat for vehicle 10. The examples in FIGS. 3A and 3B illustrate the advantage of having variable trim capability, which results in an approximate 20% reduction in the vehicle heatshield of vehicle 20 as well as a uniform thickness for the heatshield of vehicle 20 compared to the heatshield of vehicle 10 (e.g., when both vehicle 10 and vehicle 20 are used for the same mission).

According to various aspects of the subject technology, a nose cone assembly for a vehicle is provided. The nose cone assembly may be comprised of two segments that rotate in opposite directions relative to a vehicle base structure. One of the segments, which may be an angle cone portion, is configured to rotate relative to the vehicle base structure without producing a bend of the vehicle body and variation of trim angle. The second segment, which may be a nose cone portion, is configured to rotate along a slanted angle relative to the angle cone and provide the bend of the vehicle body about an axis perpendicular to a longitudinal vehicle axis, resulting in a controlled variation of the vehicle trim angle. According to certain aspects, in the event the angle cone portion and the nose cone rotate portion rotate in equal and opposite directions relative to the vehicle structure, the movement of the nose cone portion may result in a bend and variable trim of the vehicle body in a single, well defined and constant trim plane. In some aspects, in the event the nose cone portion and the angle cone portion move in unequal amounts, the resulting nose cone bend and vehicle trim may move through multiple planes relative to the longitudinal vehicle axis.

Figure 4:
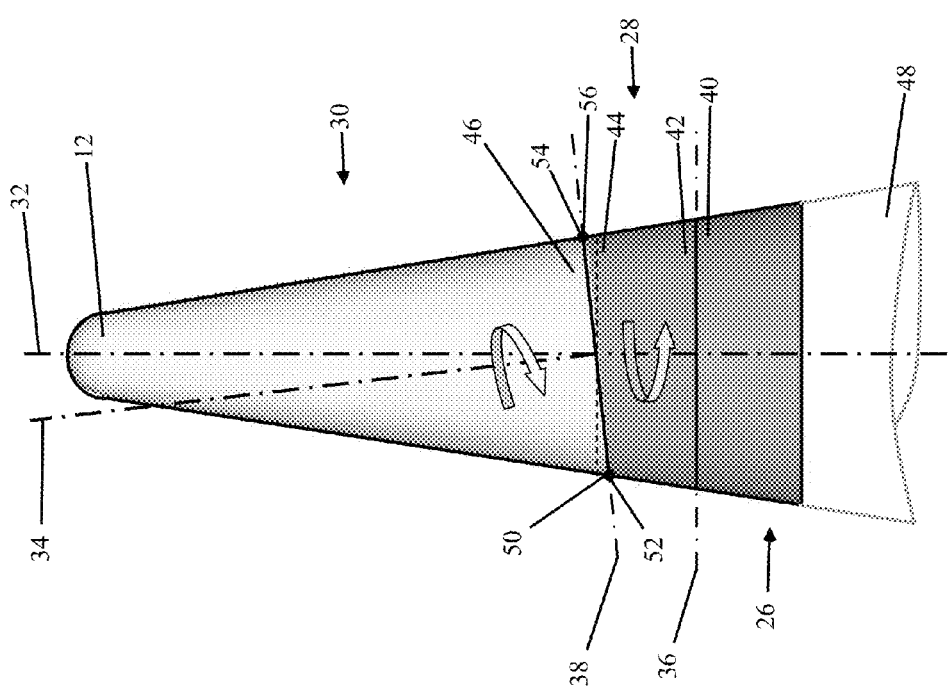
FIG. 4 illustrates a side view of a nose of a vehicle, in accordance with various aspects of the subject technology.

According to various aspects, nose 18 of vehicle 10 is configured to provide variable trim capability for vehicle 10. FIG. 4 illustrates a side view of nose 18, in accordance with various aspects of the subject technology. Nose 18 comprises base member 26 (e.g., a base cone portion) configured to attach to body 48 of vehicle 10 (e.g., the reentry body aft section of vehicle 10). Nose 18 also comprises angle cone portion 28, which is rotatably coupled to base member 26. In some aspects, base member 26 may be integral with body 48 of the vehicle (e.g., may be a part of body 48 of the vehicle). In some aspects, base member 26 is configured to couple angle cone portion 28 to body 48 of vehicle 10. Nose 18 also comprises nose cone portion 30, which is rotatably coupled to angle cone portion 28. In some aspects, angle cone portion 28 and nose cone portion 30 are arranged such that plane of rotation 38 between angle cone portion 28 and nose cone portion 30 is slanted at an angle relative to a plane perpendicular to long axis 32 of vehicle 10. Plane of rotation 36 between base member 26 and angle cone portion 28 is an example of a plane that is perpendicular to long axis 32 of vehicle 10.

Angle cone portion 28 is configured to rotate relative to base member 26 about long axis 32 of vehicle 10. Nose cone portion 30 is configured to rotate relative to angle cone portion 28 about axis 34, which is normal to plane of rotation 38. According to certain aspects, tip 12 of nose cone portion 30 is configured to vary in position relative to long axis 32 of vehicle 10 based on the rotation of angle cone portion 28 relative to base member 26 and/or the rotation of nose cone portion 30 relative to angle cone portion 28, thereby providing the variable trim capability for vehicle 10.

According to certain aspects, angle cone portion 28 and nose cone portion 30 are configured to rotate in different directions. For example, angle cone portion 28 is configured to rotate relative to base member 26 about long axis 32 in one of a clockwise direction and a counter-clockwise direction. Nose cone portion 30 is configured to rotate relative to angle cone portion 28 about axis 34 in the other of the clockwise direction and the counter-clockwise direction. Stated another way, nose cone portion 30 and angle cone portion 28 are configured to rotate in opposite directions, which may result in tip 12 of nose cone portion 30 bending relative to long axis 32. According to certain aspects, angle cone portion 28 and nose cone portion 30 are configured to rotate at the same speed. Although angle cone portion 28 and nose cone portion 30 are described as rotating in different directions and at the same speed, angle cone portion 28 and nose cone portion 30 may rotate in the same direction and/or at different speeds provided that tip 12 of nose cone portion 30 may vary in a suitable position relative to long axis 32.

According to certain aspects, tip 12 of nose cone portion 30 moves in various positions relative to long axis 32 based on the shapes of nose cone portion 30 and angle cone portion 28 and also on the manner in which nose cone portion 30 and angle cone portion 28 rotate. In some aspects, nose cone portion 30 and angle cone portion 28 substantially form a cone shape when tip 12 of nose cone portion 30 is aligned with long axis 32 of vehicle 10. In some aspects, proximal end 46 of nose cone portion 30 is in rotatable contact with distal end 44 of angle cone portion 28. A cross-sectional area of proximal end 43 of nose cone portion 30 substantially matches a cross-sectional area of distal end 44 of angle cone portion 28. In some aspects, a shape of the cross-sectional area of proximal end 46 of nose cone portion 30 and a shape of the cross-sectional area of distal end 44 of angle cone portion 28 are elliptical. In some aspects, nose cone portion 30 and angle cone portion 28 may form other suitable shapes depending on the desired trim for a particular vehicle.

According to certain aspects, the maximum angle at which tip 12 of nose cone portion 30 is displaced from long axis 32 is based on the magnitude of the angle at which plane of rotation 38 is slanted relative to a plane perpendicular to long axis 32. For example, the angle at which plane of rotation 38 is slanted relative to a plane perpendicular to long axis 32 may be less than or equal to 6 degrees. This may result in tip 12 of nose cone portion 30 being displaced at a maximum of 12 degrees from long axis 32. The subject technology, however, is not limited to these angles. In some aspects, the angle at which plane of rotation 38 is slanted may be adjusted at various magnitudes to obtain desired degrees of displacement of tip 12 relative to long axis 32. In some aspects, the angle at which plane of rotation 38 is slanted may be based on the extent of tapering of proximal end 46 of nose cone portion 30 and/or distal end 44 of angle cone portion 28.

According to certain aspects, proximal end 46 of nose cone portion 30 is tapered from a first beginning point 54 toward a first end point 50. Distal end 44 of angle cone portion 28 is tapered from a second beginning point 52 (e.g., shown in FIG. 4 as in contact with first end point 50) toward a second end point 56 (e.g., shown in FIG. 4 as in contact with first beginning point 54). In some aspects, tip 12 of nose cone portion 30 is configured to be displaced at a maximum position relative to long axis 32 when the first end point 50 is in contact with the second end point 56. In some aspects, tip 12 of nose cone portion 30 is configured to be aligned with long axis 32 when the first end point 50 is in contact with the second beginning point 52.

According to certain aspects, proximal end 42 of angle cone portion 28 is in rotatable contact with distal end 40 of base member 26. A cross-sectional area of proximal end 42 of angle cone portion 28 substantially matches a cross-sectional area of distal end 40 of base member 26. In some aspects, a shape of the cross-sectional area of proximal end 42 of angle cone portion 28 and a shape of the cross-sectional area of distal end 40 of base member 26 are circular. In some aspects, base member 26 and angle cone portion 28 may form other suitable shapes depending on the desired trim for a particular vehicle. The rotation of angle cone portion 28 and nose cone portion 30, in addition to the position of tip 12 of nose cone portion 30, will be described in further detail below with respect to FIGS. 5A, 5B, and 5C.

FIGS. 5A, 5B, and 5C illustrate side views of nose cone portion 30 and angle cone portion 28 rotated at various positions, in accordance with various aspects of the subject technology. FIG. 5A illustrates the rotation of nose cone portion 30 by an equal and opposite rotational amount compared to the rotation of angle cone portion 28, which produces the bend of tip 12 to produce trim in a single defined plane. In this illustrated case, the movement remains in the plane of the paper. In the event that nose cone portion 30 and angle cone portion 28 move in unqual rotational values, the resultant bend and trim angle may move through different planes relative to long axis 32. FIG. 5C illustrates the rotation of nose cone portion 30 and angle cone portion 28 rotating in opposite directions compared to what is shown in FIG. 5A to produce the bend of tip 12 to produce trim in the opposite direction as produced in FIG. 5A. According to certain aspects, FIG. 5B illustrates that in the case of equal and opposite rotation of nose cone portion 30 and angle cone portion 28, the vehicle trim illustrated in FIGS. 5A and 5C may remain in a single defined vehicle trim plane (e.g., plane 60).

In FIG. 5B, tip 12 of nose cone portion 30 is aligned with long axis 32 of vehicle 10, thereby producing zero lift. From this position, nose cone portion 30 may be rotated 90 degrees in a clockwise direction and angle cone portion 28 may be rotated 90 degrees in a counter-clockwise direction such that points c and b of nose cone portion 30, in addition to points D and A of angle cone portion 28, move to the positions shown in FIG. 5A. As a result of this rotation, tip 12 is bent along the direction illustrated by arrow 58. In some aspects, tip 12 may also be bent in the other direction. Returning to FIG. 5B, nose cone portion 30 may be rotated 90 degrees in a counter-clockwise direction and angle cone portion 28 may be rotated 90 degrees in a clockwise direction such that points d and c of nose cone portion 30, in addition to points A and B of angle cone portion 28, move to the positions shown in FIG. 5C. As a result of this rotation, tip 12 is bent along the direction illustrated by arrow 62. According to various aspects of the subject technology, the speed and/or direction in which nose cone portion 30 and angle cone portion 28 may be adjusted such that tip 12 varies in position relative to long axis 32 along a single plane 60 that is parallel to long axis 32.

The variable trim capability provided by the configuration of nose 18 provides various benefits. In some aspects, nose 18 may obviate use of at least one of hydraulics and one or more hinges to vary the position of tip 12 relative to long axis 32. Furthermore, a contour of nose cone portion 30, angle cone portion 28, and base member 26 may be continuous, thereby reducing drag. In some aspects, the variable trim capability of vehicle 10 allows the windward thermal loading to be distributed around the different sides of vehicle 10, in addition to allowing a reduction in thickness of the heatshield of vehicle 10. Furthermore, the variable trim capability of vehicle 10 may reduce the use of the one or more flaps 14, thereby simplifying a flap control system used to operate the one or more flaps 14. In some aspects, methods and apparatuses are provided for varying a trim of a vehicle for more accurate, efficient, and effective control and design of vehicle aerodynamic control and thermal protection systems.

Figure 5D:
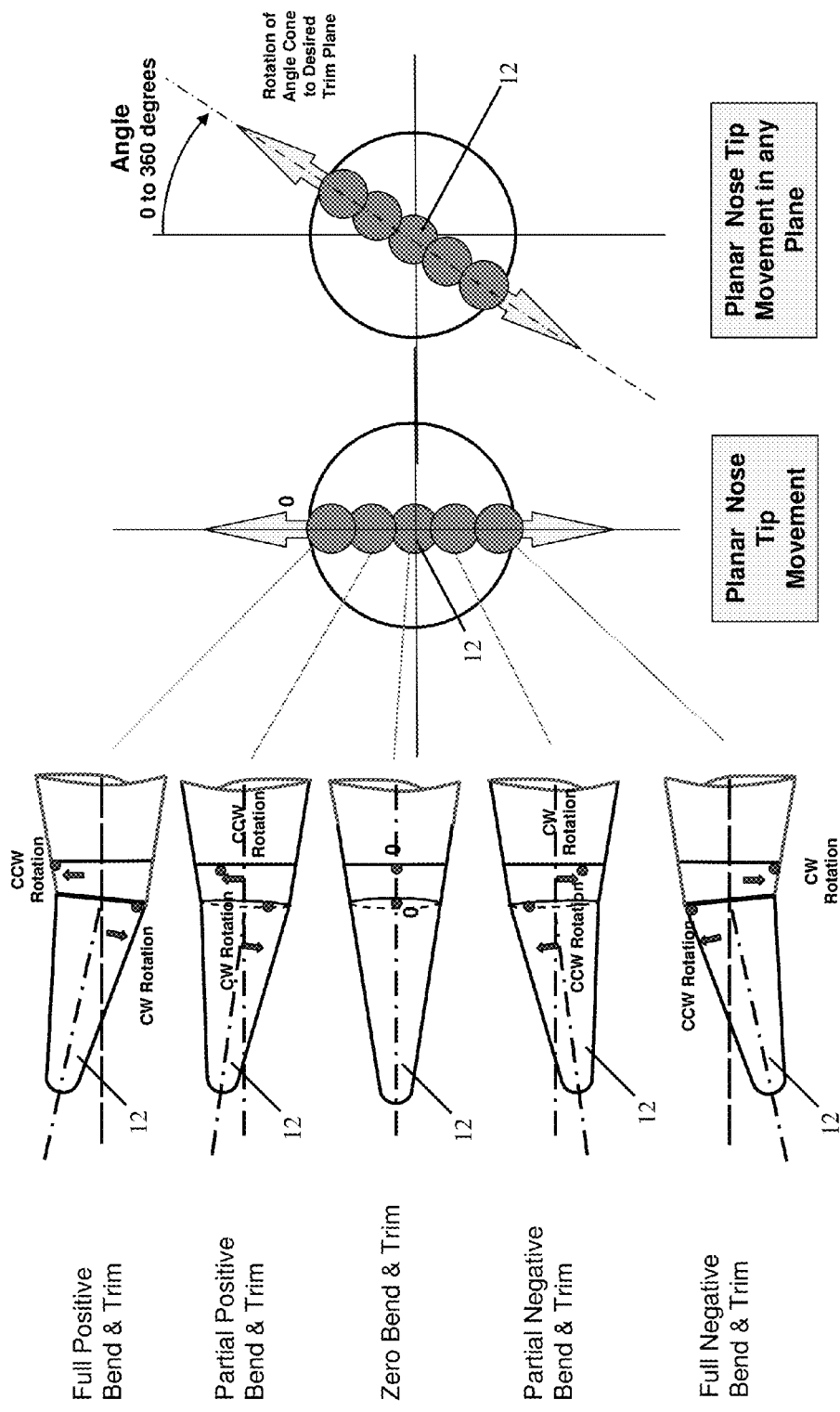
FIG. 5D illustrates an example of the motion of a tip of a nose cone portion, in accordance with various aspects of the subject technology.

FIG. 5D illustrates an example of the motion of tip 12 of nose cone portion 30, in accordance with various aspects of the subject technology. The bending of tip 12 can either be maintained in a single defined plane relative to long axis 32 or it can be made to move through different planes based on the relative rotations of angle cone portion 28 and nose cone portion 30. Based on the rotation of nose cone portion 30 and angle cone portion 28, tip 12 may move in any desired plane. In some aspects, if angle cone portion 28 and nose cone portion 30 rotate in opposite directions and at the same speed, tip 12 may bend in a single plane. In some aspects, in the event that angle cone portion 28 and nose cone portion 30 move in unequal rotational values and/or rotate at different speeds, the resultant bend of tip 12 and trim angle may move through different planes relative to long axis 32. The rotation of angle cone portion 28 and/or nose cone portion 30 may be adjusted such that tip 12 bends in various planes.

FIG. 6 illustrates an example of method 600 for varying a trim of a vehicle, in accordance with various aspects of the subject technology. Method 600 comprises rotating an angle cone portion relative to a body of the vehicle about a long axis of the vehicle (602). The angle cone portion is rotatably coupled to the body. Method 600 also comprises rotating a nose cone portion relative to the angle cone portion (604). The angle cone portion and the nose cone portion are arranged such that a plane of rotation between the angle cone portion and the nose cone portion is slanted at an angle relative to a plane perpendicular to the long axis of the vehicle. The nose cone portion is rotated about an axis normal to the plane of rotation. Method 600 also comprises varying a position of a tip of the nose cone portion relative to the long axis of the vehicle based on the rotating the angle cone portion and the rotating the nose cone portion (606).

Articulating Body Mechanization

According to various aspects of the subject technology, methods and apparatus are provided to drive rotational elements of a vehicle, such as nose cone portion 30 and angle cone portion 28. In some aspects, the methods and apparatus provided for driving rotational elements may be implemented for vehicles that use articulating members or vehicle sections, such as, for example and without limitation, aircraft, boats, automobiles, projectiles, and spacecraft/aerospace vehicles.

In some aspects, an apparatus for driving rotational elements of a vehicle comprises a driving member configured to rotate a first rotational element (e.g., an angle cone) of the vehicle relative to a body of the vehicle structure. In some aspects, a second driving member may drive and rotate a second rotational element (e.g., a nosecone) in the opposite direction of the first rotational element relative to the body of the vehicle structure. In some aspects, the second driving member may comprise a gimbal element coupled to a drive structure via universal joint pins that constrain the movement of the second rotational element to bend the second rotational element relative to the vehicle structure such that the movement of the second rotational element can be either maintained within a single defined trim plane, or in multiple planes relative to the vehicle axis.

Figure 7A:
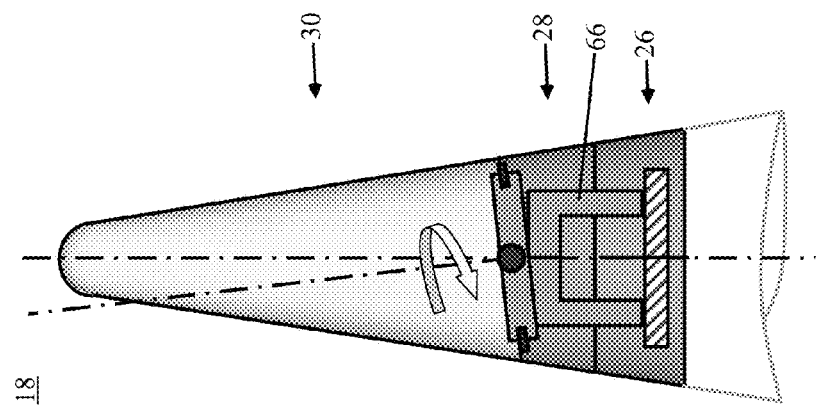
FIGS. 7A and 7B illustrate side views of a first driving member and a second driving member used to drive an angle cone portion and a nose cone portion, respectively, in accordance with various aspects of the subject technology.
Figure 7B:
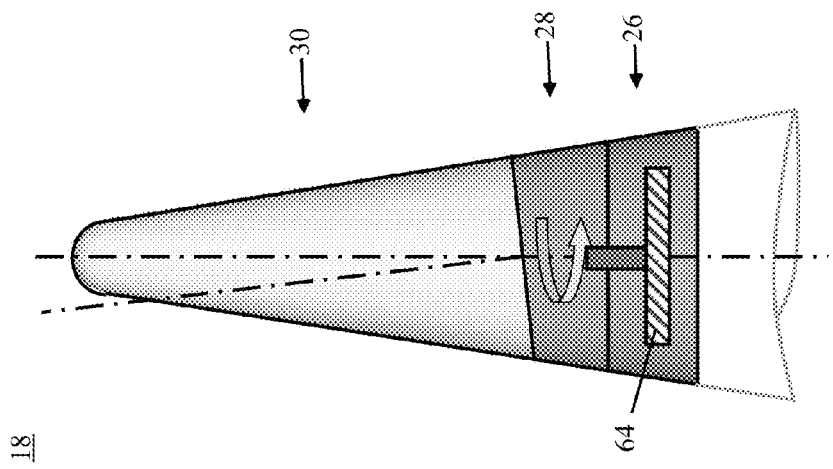

FIGS. 7A and 7B illustrate side views of first driving member 64 and second driving member 66 used to drive angle cone portion 28 and nose cone portion 30, respectively, in accordance with various aspects of the subject technology. First driving member 64 is coupled to base member 26 and is configured to rotate angle cone portion 28 relative to base member 26. Second driving member 66 is also coupled to base member 26 and configured to rotate nose cone portion 30 relative to base member 26 and/or angle cone portion 28.

In some aspects, first driving member 64 is configured to rotate angle cone portion 28 relative to base member 26 in one of a clockwise direction and a counter-clockwise direction. Second driving member 66 may be configured to rotate nose cone portion 30 relative to angle cone portion 28 in the other of the clockwise direction and the counter-clockwise direction. According to certain aspects, first driving member 64 is configured to rotate angle cone portion 28 at the same speed as second driving member 66 rotates nose cone portion 30. Although first driving member 64 and second driving member 66 are described as rotating different rotational elements in different directions and at the same speed, first driving member 64 and second driving member 66 may rotate different rotational elements in the same direction and/or at different speeds.

FIG. 8A illustrates a side view of second driving member 66 while FIG. 8B illustrates a top view of second driving member 66, in accordance with various aspects of the subject technology. Second driving member 66 comprises actuator 68 coupled to base member 26. In some aspects, actuator 68 is configured to rotate nose cone portion 30 through a gimbaled pin assembly while angle cone portion 28 is rotated by first driving member 64. In some aspects, the gimbaled pin assembly may allow nose cone portion 30 to follow the slant angle (e.g., of plane of rotation 38) as defined by the position of angle cone portion 28.

According to certain aspects, second driving member 66 also comprises drive structure 70 coupled to actuator 68. In some aspects, actuator 68 is configured to rotate drive structure 70 (e.g., which may be referred to as an inner shell assembly) relative to base member 26. Second driving member 66 also comprises gimbal element 72 and first joint pin 74a coupling gimbal element 72 to drive structure 70. For example, drive structure 70 is pinned to gimbal element 72 via first joint pin 74a. According to certain aspects, drive structure 70 and first joint pin 74a are configured to translate rotation from actuator 68 to gimbal element 72. Second driving member 66 also comprises first connection pin 76a configured to couple gimbal element 72 to nose cone portion 30. For example, gimbal element 72 is pinned to nose cone portion 30 via first connection pin 76a. Gimbal element 72 and first connection pin 76a are configured to translate rotation from drive structure 70 to nose cone portion 30 to rotate nose cone portion 30 relative to angle cone portion 28 and/or base member 26. Thus, drive structure 70, first joint pin 74a, gimbal element 72, and first connection pin 76a are configured to translate rotation from actuator 68 to nose cone portion 30, thereby driving nose cone portion 30.

According to certain aspects, drive structure 70 is disposed within angle cone portion 28, and translates its rotation to gimbal element 72, which then translates the rotation to nose cone portion 30. In some aspects, drive structure 70 comprises a cylindrical body and a conical head. First joint pin 74a may be attached to a tip of the conical head and to a body of gimbal element 72. In some aspects, gimbal element 72 comprises a ring (e.g., a universal ring) or some other suitable elliptical body. The ring may surround a body of drive structure 70. In some aspects, a diameter of the ring may be greater than a diameter of the cylindrical body of drive structure 70. In some aspects, a cross-sectional area of gimbal element 72 is greater than a cross-sectional area of drive structure 70. The subject technology is not limited to the arrangement shown in FIGS. 8A and 8B. Drive structure 70 and gimbal element 72 may comprise other suitable shapes provided that the rotation from actuator 68 is translated to nose cone portion 30.

According to certain aspects, first joint pin 74a is aligned perpendicularly to a central axis of drive structure 70 and/or a central axis of gimbal element 72. In some aspects, the central axis of drive structure 70 and/or the central axis of gimbal element 72 may be aligned with long axis 32 of vehicle 10. In some aspects, second driving member 66 comprises second joint pin 74b coupling gimbal element 72 to drive structure 70. Second joint pin 74b may be aligned with first joint pin 74a. In some aspects, drive structure 70, first joint pin 74a, and second joint pin 74b are configured to translate rotation from actuator 68 to gimbal element 72. According to certain aspects, second driving member 66 may comprise any suitable number of joint pins such that the joint pins may translate rotation from drive structure 70 to gimbal element 72.

In some aspects, first connection pin 76a is aligned perpendicularly to the central axis of gimbal element 72 and/or a central axis of nose cone portion 30. In some aspects, the central axis of gimbal element 72 and/or the central axis of nose cone portion 30 may be aligned with long axis 32 of vehicle 10. According to certain aspects, second driving member 66 comprises second connection pin 76b configured to couple gimbal element 72 to nose cone portion 30. Second connection pin 76b may be aligned with first connection pin 76a. In some aspects, gimbal element 72, first connection pin 76a, and second connection pin 76b are configured to translate rotation from drive structure 70 to nose cone portion 30 to rotate nose cone portion 30 relative to angle cone portion 28. According to certain aspects, second driving member 66 may comprise any suitable number of connection pins such that the connection pins may translation rotation from gimbal element 72 to nose cone portion 30.

According to certain aspects, gimbal element 72 (and nose cone portion 30) is aligned with plane of rotation 38. For example, gimbal element 72 is attached to a bottom side of nose cone portion 30, which is in rotatable contact with a top side of angle cone portion 28. Thus, as nose cone portion 30 is rotated relative to angle cone portion 28, a given point on the bottom side of nose cone portion 30 follows a contour of the top side of angle cone portion 28. For example, if point G of angle cone portion 28 is rotated to be in contact with point E of nose cone portion 30, point E of nose cone portion 30 would be displaced farther away from base member 26 compared to if point E were in contact with point F of angle cone portion 28. According to certain aspects, first and second joint pins 74a and 74b facilitate this displacement by acting as a universal joint at which gimbal element 72 may pivot. Thus, gimbal element 72 may tilt about first and second joint pins 74a and 74b such that any given point on the bottom side of nose cone portion 30 can follow the contour of the top side of angle cone portion 28. In some aspects, gimbal element 72 is configured to pivot about first joint pin 74a and/or second joint pin 74b relative to drive structure 70 depending on the rotation of angle cone portion 28 relative to base member 26 and/or the rotation of nose cone portion 30 relative to angle cone portion 28.

FIG. 9 illustrates an example of method 900 for driving rotational elements of a vehicle, in accordance with various aspects of the subject technology. Method 900 comprises rotating a first rotational element of the vehicle relative to a body of the vehicle (902). Method 900 also comprises rotating a drive structure relative to the body (904). The drive structure is coupled to a gimbal element via a first joint pin. The gimbal element is coupled to a second rotational element of the vehicle such that when the drive structure is rotated relative to the body, the second rotational element rotates relative to the first rotational element. Method 900 also comprises pivoting the gimbal element about the first joint pin relative to the drive structure based on the rotation of the first rotational element and the rotation of the second rotational element (906).

Figure 10:
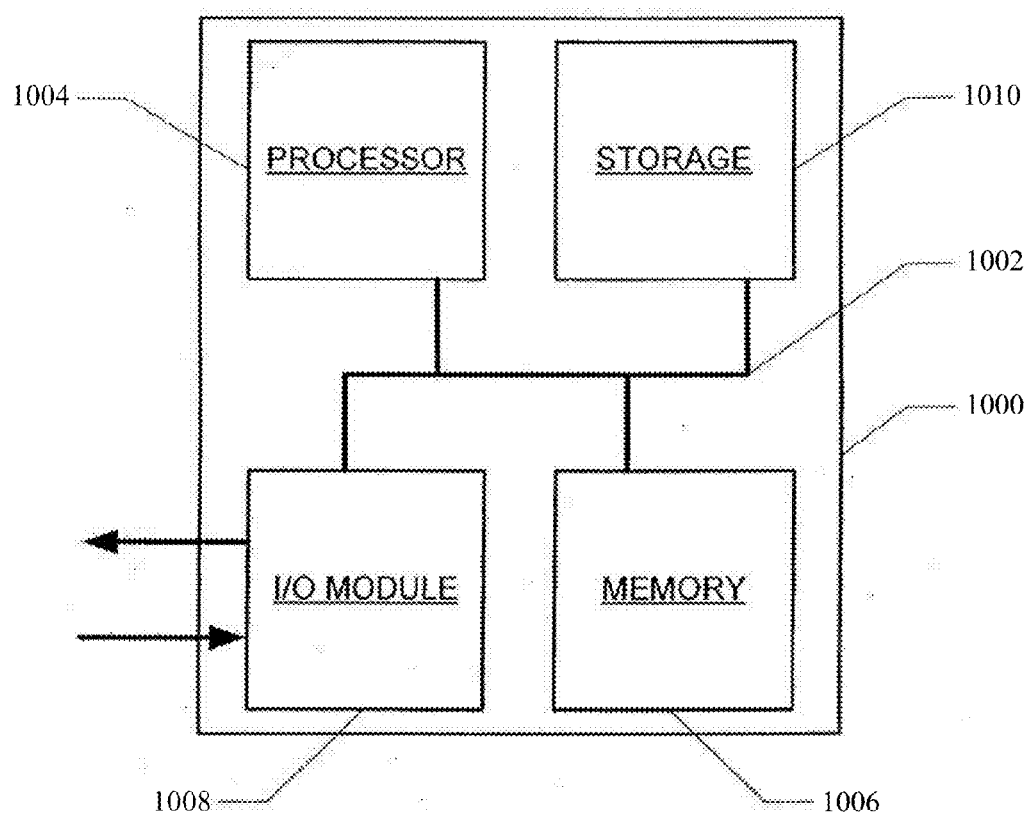
FIG. 10 is a block diagram illustrating components of controller 1000, in accordance with various aspects of the subject technology.

FIG. 10 is a block diagram illustrating components of controller 1000, in accordance with various aspects of the subject technology. Controller 1000 comprises processor module 1004, storage module 1010, input/output (I/O) module 1008, memory module 1006, and bus 1002. Bus 1002 may be any suitable communication mechanism for communicating information. Processor module 1004, storage module 1010, I/O module 1008, and memory module 1006 are coupled with bus 1002 for communicating information between any of the modules of controller 1000 and/or information between any module of controller 1000 and a device external to controller 1000. For example, information communicated between any of the modules of controller 1000 may include instructions and/or data. In some aspects, bus 1002 may be a universal serial bus. In some aspects, bus 302 may provide Ethernet connectivity.

In some aspects, processor module 1004 may comprise one or more processors, where each processor may perform different functions or execute different instructions and/or processes. For example, one or more processors may execute instructions for implementing method 600 and/or method 900, and one or more processors may execute instructions for input/output functions.

Memory module 1006 may be random access memory ("RAM") or other dynamic storage devices for storing information and instructions to be executed by processor module 1004. Memory module 1006 may also be used for storing temporary variables or other intermediate information during execution of instructions by processor 1004. In some aspects, memory module 1006 may comprise battery-powered static RAM, which stores information without requiring power to maintain the stored information. Storage module 1010 may be a magnetic disk or optical disk and may also store information and instructions. In some aspects, storage module 1010 may comprise hard disk storage or electronic memory storage (e.g., flash memory). In some aspects, memory module 1006 and storage module 1010 are both a machine-readable medium.

In some aspects, controller 1000 is coupled via I/O module 1008 to a user interface for providing information to and receiving information from an operator implementing method 600 and/or method 900. For example, the user interface may be a cathode ray tube ("CRT") or LCD monitor for displaying information to an operator. The user interface may also include, for example, a keyboard or a mouse coupled to controller 1000 via I/O module 1008 for communicating information and command selections to processor module 1004.

According to various aspects of the subject disclosure, methods described herein are executed by controller 1000. Specifically, processor module 1004 executes one or more sequences of instructions contained in memory module 1006 and/or storage module 1010. In one example, instructions may be read into memory module 1006 from another machine-readable medium, such as storage module 1010. In another example, instructions may be read directly into memory module 1006 from I/O module 1008, for example from an operator implementing method 600 and/or method 900 via the user interface. Execution of the sequences of instructions contained in memory module 1006 and/or storage module 1010 causes processor module 1004 to perform methods for varying a trim of a vehicle and/or methods for driving rotational elements. For example, a computational algorithm for varying a trim of a vehicle and/or for driving rotational elements may be stored in memory module 1006 and/or storage module 1010 as one or more sequences of instructions. Information such as the rotational speed of angle cone portion 28 and/or nose cone portion 30, the direction in which angle cone portion 28 and/or nose cone portion 30 are rotating, the position of tip 12 relative to long axis 32, and/or the temperature of a side of vehicle 10 (e.g., the temperature of the heatshield on the windward side of vehicle 10) may be communicated from processor module 1004 to memory module 1006 and/or storage module 1010 via bus 1002 for storage. In some aspects, the information may be communicated from processor module 1004, memory module 1006, and/or storage module 1010 to I/O module 1008 via bus 1002. The information may then be communicated from I/O module 1008 to an operator implementing method 600 and/or method 900 via the user interface.

One or more processors in a multi-processing arrangement may also be employed to execute the sequences of instructions contained in memory module 1006 and/or storage module 1010. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 1004 for execution. Such a medium may take many forms, including, but not limited to, non-volatile media, and volatile media. Non-volatile media include, for example, optical or magnetic disks, such as storage module 1010. Volatile media include dynamic memory, such as memory module 1006. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A nose cone assembly comprising:
   an angle cone portion configured to rotatably couple to a body of a vehicle; and
   a nose cone portion rotatably coupled to the angle cone portion,
   wherein the angle cone portion and the nose cone portion are arranged such that a plane of rotation between the angle cone portion and the nose cone portion is slanted at an angle relative to a plane perpendicular to a long axis of the vehicle, and
   wherein a) the angle cone portion is configured to rotate relative to the body about the long axis of the vehicle, b) the nose cone portion is configured to rotate relative to the angle cone portion about an axis normal to the plane of rotation, and c) a tip of the nose cone portion is configured to vary in position relative to the long axis of the vehicle based on the rotation of the angle cone portion and the rotation of the nose cone portion.

2. The apparatus of claim 1, wherein the vehicle comprises a projectile.

3. The apparatus of claim 1, wherein the angle cone portion is configured to rotate relative to the body about the long axis of the vehicle in one of a clockwise direction and a counter-clockwise direction, and wherein the nose cone portion is configured to rotate relative to the angle cone portion about the axis normal to the plane of rotation in the other of the clockwise direction and the counter-clockwise direction.

4. The apparatus of claim 1, wherein the angle cone portion and the nose cone portion are configured to rotate at the same speed.

5. The apparatus of claim 1, wherein the tip of the nose cone portion is configured to vary in position relative to the long axis of the vehicle along a single plane parallel to the long axis of the vehicle when the angle cone portion rotates relative to the body and the nose cone portion rotates relative to the angle cone portion.

6. The apparatus of claim 1, wherein the angle is less than or equal to 6 degrees.

7. The apparatus of claim 1, wherein the tip of the nose cone portion is configured to be displaced at less than or equal to 12 degrees from the long axis of the vehicle when the angle cone portion rotates relative to the body and the nose cone portion rotates relative to the angle cone portion.

8. The apparatus of claim 1, wherein a proximal end of the nose cone portion is in rotatable contact with a distal end of the angle cone portion, wherein a cross-sectional area of the proximal end of the nose cone portion substantially matches a cross-sectional area of the distal end of the angle cone portion, wherein the proximal end of the nose cone portion is tapered from a first beginning point toward a first end point, wherein the distal end of the angle cone portion is tapered from a second beginning point toward a second end point, wherein the tip of the nose cone portion is configured to be displaced at a maximum position relative to the long axis of the vehicle when the first end point is in contact with the second end point, and wherein the tip of the nose cone portion is configured to be aligned with the long axis of the vehicle when the first end point is in contact with the second beginning point.

9. The apparatus of claim 8, wherein a shape of the cross-sectional area of the proximal end of the nose cone portion and a shape of the cross-sectional area of the distal end of the angle cone portion are elliptical.

10. The apparatus of claim 1, wherein the nose cone portion and the angle cone portion substantially form a cone shape when the tip of the nose cone portion is aligned with the long axis of the vehicle.

11. The apparatus of claim 1, further comprising a base member configured to couple the angle cone portion to the body, wherein a proximal end of the angle cone portion is in rotatable contact with a distal end of the base member, and wherein a cross-sectional area of the proximal end of the angle cone portion substantially matches a cross-sectional area of the distal end of the base member.

12. The apparatus of claim 11, wherein a shape of the cross-sectional area of the proximal end of the angle cone portion and a shape of the cross-sectional area of the distal end of the base member are circular.

13. The apparatus of claim 1, wherein the apparatus is configured to obviate use of at least one of hydraulics and one or more hinges to vary the position of the tip of the nose cone portion relative to the long axis of the vehicle.

14. The apparatus of claim 1, wherein a contour of the nose cone portion and the angle cone portion is continuous.

15. A method for varying a trim of a vehicle, the method comprising:
   providing an angle cone portion for rotating the angle cone portion relative to a body of the vehicle about a long axis of the vehicle, wherein the angle cone portion is configured to rotatably couple to the body; and
   providing a nose cone portion rotatably coupled to the angle cone portion for rotating the nose cone portion relative to the angle cone portion, wherein the angle cone portion and the nose cone portion are arranged such that a plane of rotation between the angle cone portion and the nose cone portion is slanted at an angle relative to a plane perpendicular to the long axis of the vehicle, wherein the nose cone portion is configured to rotate about an axis normal to the plane of rotation, and wherein a tip of the nose cone portion is configured to vary in position relative to the long axis of the vehicle based on the rotation of the angle cone portion and the rotation of the nose cone portion.

16. The method of claim 15, wherein the angle cone portion is rotated relative to the body about the long axis of the vehicle in one of a clockwise direction and a counter-clockwise direction, and wherein the nose cone portion is rotated relative to the angle cone portion about the axis normal to the plane of rotation in the other of the clockwise direction and the counter-clockwise direction.

17. The method of claim 15, wherein the angle cone portion and the nose cone portion are rotated at the same speed.

18. The method of claim 15, wherein the tip of the nose cone portion is configured to vary in position relative to the long axis of the vehicle along a single plane parallel to the long axis of the vehicle when the angle cone portion is rotated relative to the body and the nose cone portion is rotated relative to the angle cone portion.

19. An airborne vehicle comprising:
   a body; and
   a nose cone assembly comprising:
      an angle cone portion rotatably coupled to the body; and
      a nose cone portion rotatably coupled to the angle cone portion,
   wherein the angle cone portion and the nose cone portion are arranged such that a plane of rotation between the angle cone portion and the nose cone portion is slanted at an angle relative to a plane perpendicular to a long axis of the vehicle, and wherein a) the angle cone portion is configured to rotate relative to the body about the long axis of the vehicle, b) the nose cone portion is configured to rotate relative to the angle cone portion about an axis normal to the plane of rotation, and c) a tip of the nose cone portion is configured to vary in position relative to the long axis of the vehicle based on the rotation of the angle cone portion and the rotation of the nose cone portion.

20. The vehicle of claim 19, wherein the nose cone assembly further comprises a heat shield forming an outer layer of the nose cone assembly, the heat shield being distributed symmetrically about the long axis of the vehicle.

* * * * *